United States Patent Office 3,463,557
Patented Aug. 26, 1969

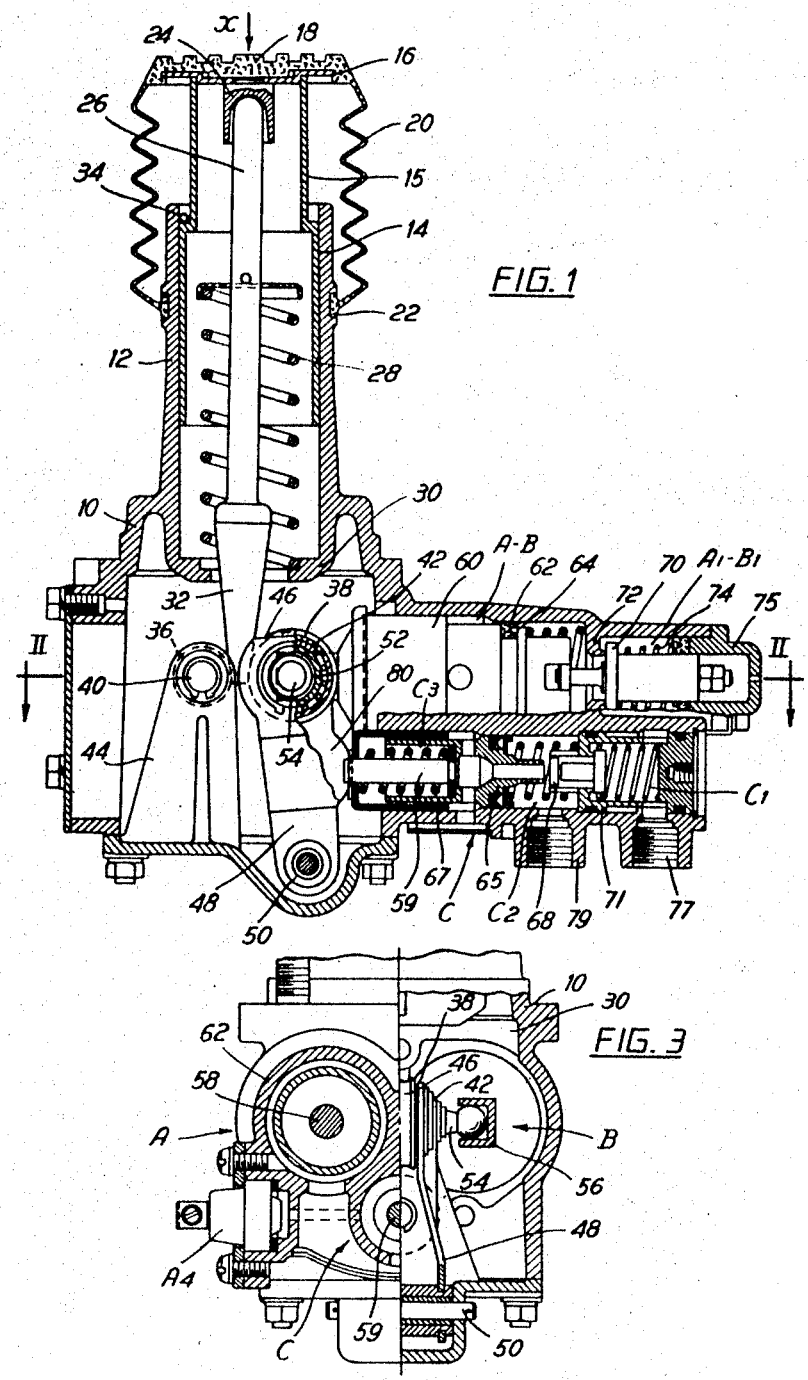

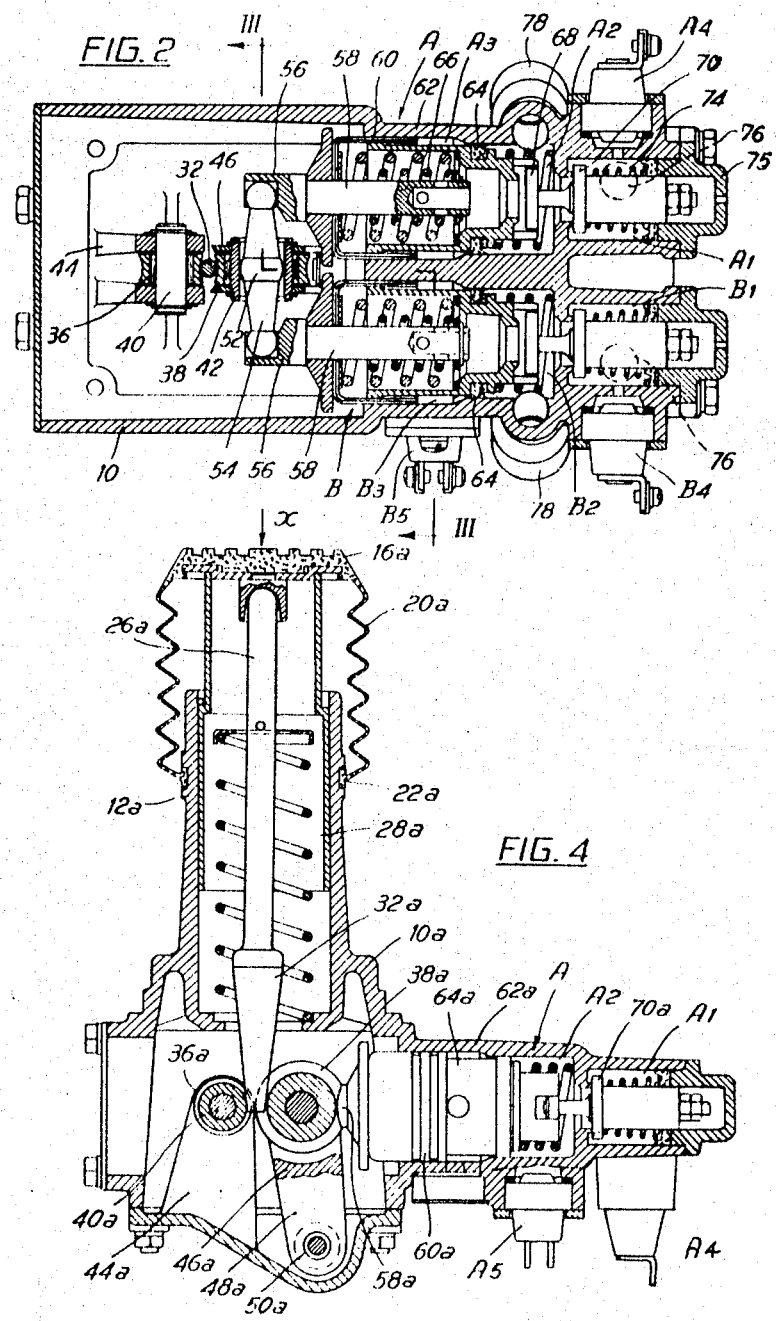

3,463,557
PLUNGER ACTUATED DISTRIBUTOR FOR PNEUMATIC BRAKING SYSTEMS IN VEHICLES
Giuseppe Alfieri, Milan, Italy, assignor to Fabbrica Italiana Magneti Marelli S.p.A., Milan, Italy, a corporation of Italy
Filed Apr. 17, 1967, Ser. No. 631,472
Claims priority, application Italy, May 17, 1966, 11,256/66
Int. Cl. B60t 15/06; F16k 31/44; B65t 13/00
U.S. Cl. 303—52                                3 Claims

ABSTRACT OF THE DISCLOSURE

A distributor for pneumatic braking systems wherein one or more sections are controlled by shut off devices, these devices being actuated by a braking pedal through mechanism including a pair of guide members which are spread apart as the braking pedal is operated with at least one of these members being movable to actuate the shut off devices.

This invention relates to a distributor for penumatic braking systems, for vehicles in general, in which said systems may comprise one or more sections operable in the required sequence.

The purpose of the invention is to provide a distributor of the type under consideration, which may be conveniently installed, with minimum space requirements and which does not call for the use of mechanical or other types of transmission to operatably connect the actuating pedal with the movable parts of the distributor itself. Specifically, the purpose of the present invention is to provide a distributor which consents, by fast and practical operation, a wide range of performance and, in the case of a distributor having a plurality of sections, to anticipate with the desire time lag the braking operation of one section, with respect to the remaining sections, or to obtain different values of the maximum pressure attainable in the different sections.

A further object of the invention is to provide a distributor which affords optimum sensitivity in the sense that with an equal displacement of the actuating pedal, the shut-off elements in the different sections are shifted instantly and in the desired degree.

The distributor according to this invention for pneumatic systems with one or more sections is characterized in that the shaped head (plug) is inserted between two guiding elements, at least one of which is of the oscillating type, to actuate the shut-off means located alongside the longitudinal axes of the sand shaped head or plug. In said distributor, the driving element of a plunger type springing assembly, carried by the same, operates in conjunction with the actuating pedal on one end and on the other end with a suitably shaped head or plug actuating one or more shut-off devices pertaining to the different braking sections in the system.

In accordance with the invention, one of the movable guide elements is supported by at least one rocking lever, pivoted to the distributor body, urged by spring means, and which holds at least one grooved roller operating jointly with the shaped head of the driving element.

The shut-off means may be operated either directly through the movable drive element or indirectly by means of a rocking lever, in cases where two or more shut-off devices are contemplated by the distributor. The advance operation of one of said shut-off devices may be effected by incorporating springing means into said shut-off devices, and which perform different springing actions, and/or rocking levers with unequal arms.

The invention will now be explained by the following description taken in conjunction with the attached drawings, given only by way of example.

FIGURE 1 is a longitudinal cross section of one embodiment of a distributor with three braking sections, according to this invention.

FIGURE 2 is a horizontal cross section, taken on lines II—II of FIGURE 1.

FIGURE 3 is a detailed cross section taken along line III—III of FIGURE 2.

FIGURE 4, similar to FIGURE 1, shows a cross section of a distributor having only one braking section.

Considering FIGURES 1 to 3 of the drawings, the distributor shown consists of a casing or shell 10 which houses three sets of valve, the first two of which A and B, are identical and placed adjacent to each other on a common horizontal plane, whilst the 3rd set C is located below the former and with its axis in parallel. The design of these three groups, which is substantially identical, is of the known type, and will be described infra.

The housing 10 has towards its upper end, a tube 12, forming a cylinder in which a hollow piston 14 operates, and the upper portion 15 of which is narrowed and closed by a bottom piece 16. A cap 18, in elastic material is held by the bottom piece 16 so as to form a pedal drive and is furnished with a bellows wall 20, the edge of which is engaged with a groove 22 in the wall of said cylinder 12. An inverted cupped block 24 is secured to the bottom plate 16, said push rod forming one of the components of an articulated joint, while the other component of the joint consists of the rounded end of a push rod 26. A helical spring 28 is inserted over push rod 26 and anchored to it, the other end of said spring is held by a drilled recess in the bottom of cylinder 12. The other end of rod 26 carries a wedge shaped head or plug 32, consisting of a conical body, co-axial with rod 26, for the reasons explained infra. The latter rod 26 and the parts just considered form a spring slider held in an elevated position by the action of helical spring 28 said position being set by a stop pin 34, tangentially inserted adjacent to the upper opening of hollow cylinder 12, and which engages the ledge between piston 14 and the narrowed portion 15. When rod 26 is in the position just considered, its wedge shaped or conical plug 32 is located and more or less engaged between two rollers 36 and 38, provided with peripheral grooves and rotatably held by respective pivots 40 and 42. The pivot 40 is held by a couple of drilled supports 44, forming a single body with or otherwise secured to the inside of shell or casing 10.

On the other hand, pivot 42 is axially drilled so as to form a hub, and is held by the fork shaped end 46 of a lever 48 pivoted by a pivot 50, to the casing or shell 10. A spherical head 52, is housed in the hole of pivot 42; said spherical head is in turn secured to a rocking lever 54 the ends of which are connected by articulated joints 56, with the movable parts of the two sets of valves A and B. In view of the known and equal structure of the two sets A and B, the component parts thereof are identified with equal numbers. Each of the articulated joints 56 is connected with a stem 58 inserted over a sliding cap 60 guided in a cylinder 62, in the housing or shell 10 of the distributor.

A piston 64 slides air tight within the cylinder 62 and is operatably connected with stem 58 by means of springs 66, to form a self feeding valve. Piston 64 is axially drilled, and has, adjacent to its bottom a crown forming one of the seats for double valve 68-70; the other seat 72 of this valve is represented by the bottom of cylinder 62, under consideration.

Double valve 68–70 is urged by a spring 74 which is held by a cap 75, secured, in turn to the body 10 and also serves as a guide for said double valve.

The parts just considered in each set of valves form 3 chambers, $A_1$, $A_2$, $A_3$ and $B_1$, $B_2$, $B_3$ arranged in succession to each other; the first two chambers are communicant with each other through connections 76 and 78, and respectively with the compressed air source and pneumatic operator actuating the brakes in the braking section under consideration. Lastly, the third chamber, $A_3$, $B_3$ formed inside piston 64 communicates directly with the atmosphere through suitable openings in housing 10.

The third set of valves C is arranged underneath and in an intermediate position with respect to the two sets of valves A and B. The structure of this assembly, as already stated is identical to the sets of valves A and B. The parts identical to those just now considered are identified in the figures of the drawings with consecutive odd numbers. In this case, stem 59, which cooperates through spring 67 with piston 65 is operatably connected, with its rounded end, with a cam 80 presented in a suitable position by lever 48, between the pivots 42 and 50. The distributor illustrated in FIGURES 1 through 3 is then completed by devices to control the pressures prevailing in the different braking sections and to indicate operation of the braking; specifically, chambers $A_1$, $B_1$ and $C_1$ are connected with the movable elements of pressure switches $A_4$, $B_4$ and $C_4$ to indicate to the operator any possible drop in pressure, however caused, which may occur in the braking section controlled by the set of valves just considered. Furthermore, said distributor is provided with an electric switch $B_5$, actuated by either one of pistons 64 and 65 to indicate the start of the braking operation to the vehicle which is directly behind. The mode of operation of the sets of valves A, B and C is known in the art in the sense that when intermediate chambers $A_2$, $B_2$ and $C_2$ are communicant with chambers $A_3$, $B_3$ and $C_3$ and consequently with the atmosphere. The communication between said intermediate chambers and the compressed air source is closed and vice versa.

The operation of the sets of valves may take place either simultaneously or in succession, to effect, in the latter case, advance braking of one section with respect to the others. The result may be obtained in different ways, in the case of the distributor under consideration. For example, the spring or springs 66 in the single assemblies A and B may have different spring characteristics. In the case considered, however, the advance operation of one of the two sections A or B may be easily obtained by providing rocking lever 54 with arms of different lengths; that is, the spherical head of the rocking lever is arranged asymmetrically with respect to its ends 56. In this manner it is possible to obtain different pressures in the two sections. The head 52 even if displaced, always remains in engagement, in a suitable manner, with the walls of the bore in pivot 42. When head 32 is inserted between rollers 36 and 38 the lever 48 is made to oscillate so as to approach the articulated joints 56. If the length of the rocking lever arms is the same, the two sets of valves A and B are actuated simultaneously whilst if the length of said arms differs the set of valves relative to the shorter arm of the rocking lever is actuated in advance, to deliver to the brake operating elements, air at a higher pressure with respect to that in the other set of valves. When the conical head or plug 32 is inserted between the two grooved rollers 36 and 38, and in view of the fact that the first roller is fixed (i.e. it may only rotate), lever 48 is immediately caused to oscillate in a clockwise direction (FIGURE 1) so as to actuate sets of valves A, B, and C in the desired sequence.

During the axial displacement of the way 26, the conical head of plug 32 accomplishes one oscillation in the plane coinciding with or parallel to the oscillating plane of lever 48 and the head or plug is guided on said plane by the fixed grooved roller 36 and movable roller 38, thus avoiding the possibility of disengagement of the plug from the rollers especially when the distributor is actuated by the operator intermittently.

The distributor shown in FIGURE 4 is, as we have already stated, for only one braking section. The parts identical to those shown in FIGURES 1 and 3 are identified by the same reference symbols.

In this variation, roller 38a on which the plug 32a acts, engages the shaped end of stem 58a, to actuate the set of valves A, in the manner previously described.

It is evident from the above description that the distributor according to this invention may easily be assembled, in the construction phase, as a simple distributor (FIGURE 4) as a double acting distributor (with its two sections adjacent, horizontally, as in FIGURE 2), (or vertically) or as a triple acting distributor (FIGURES 1 through 3). Obviously the present invention also considers other multi-section distributors, in which the different groups of valves are arranged adjacent to and/or one over the other according to the criteria just now described, by modifying only the part of casing 10 which carries the cylinders 62. The patent does not exclude the possibility that, always in the case of multiple section distributors the sections may be arranged opposite to each other; in such a case, roller 36 is attached to rocking lever similar to lever 48.

The casing or shell 10 is provided with means suitable to secure it to the framework of the vehicle, for example, to the footboard in the vehicle's cabin, so that the pedal 18 may be conveniently located and easily accessible to the operator, along with the other pedals and accessory means of the vehicle. The shaping of head 32 may be the best suited depending on the ratios which are desired to obtain between the displacement of pedal 18 and that of valves 68–70. The same holds true for lever 48 whose arms may be of differing lengths.

I claim:

1. In a distributor for pneumatic braking systems having a casing and a pair of braking sections each of which has a valve which connects said section alternately with a source of compressed air and with the atmosphere, each of said valves being operated by a valve stem, said valve stems being spaced from each other, a rocker arm pivotally mounted in said casing, a pair of guide elements one of which is mounted on the free end of said arm and the other of which is secured to said casing, pedal means adapted to be pushed by an operator, a plunger device having its one end in contact with said pedal means and having at its other end a wedge shaped head, said plunger device being movable in response to a pushing force on said pedal means to bring said head between said guide elements to thereby move said elements apart and move said arm in one direction about its pivot, and means responsive to movement of said arm in said direction about its pivot for contacting and for pushing each of said valve stems to actuate each of said valves to operate each of said braking sections.

2. Apparatus as set forth in claim 1 in which said means includes a bar extending through said guide element on the free end of said rocker arm, and means for connecting one end of said bar with the stem of one of said valves and the other end of said bar with the stem of the other of said valves.

3. Apparatus as set forth in claim 1 including a third braking section and a valve associated with said third braking section, the stem of said valve associated with said third braking section being disposed below and spaced from the stems of the valves of said other braking sections and wherein the end of the valve stem for said third braking section lies in the path of movement of said arm as it moves in said direction about its pivot, whereby said arm contacts said last mentioned valve stem to operate said third braking section as said arm is moved about its pivot in said direction.

References Cited

UNITED STATES PATENTS

| | | | |
|---|---|---|---|
| 1,779,064 | 10/1930 | Gohring | 251—295 X |
| 3,334,858 | 8/1967 | Hay | 251—204 X |
| 2,501,578 | 3/1950 | Pointer | 188—152 X |
| 2,563,868 | 8/1951 | Reichard | 251—229 XR |
| 2,757,640 | 8/1956 | White | 188—152 XR |
| 2,969,855 | 1/1961 | Demorest. | |
| 2,971,799 | 2/1961 | Knecht | 303—54 |
| 3,047,341 | 7/1962 | Alfieri | 303—53 |
| 3,139,762 | 7/1964 | Alfieri | 74—110 |
| 3,284,141 | 11/1966 | Henry-Biabaud | 303—53 X |
| 3,302,473 | 2/1967 | Lowry et al. | 74—110 |

FOREIGN PATENTS

| | | |
|---|---|---|
| 494,766 | 7/1950 | Belgium. |
| 537,317 | 2/1957 | Canada. |
| 796,868 | 4/1936 | France. |

MILTON BUCHLER, Primary Examiner

J. J. McLAUGHLIN, JR., Assistant Examiner

U.S. Cl. X.R.

137—595; 251—229, 251; 303—7, 54, 56